Oct. 22, 1940.   J. L. THOMAS   2,218,564
DRAG TYPE SCRAPER
Filed July 26, 1938   3 Sheets-Sheet 1
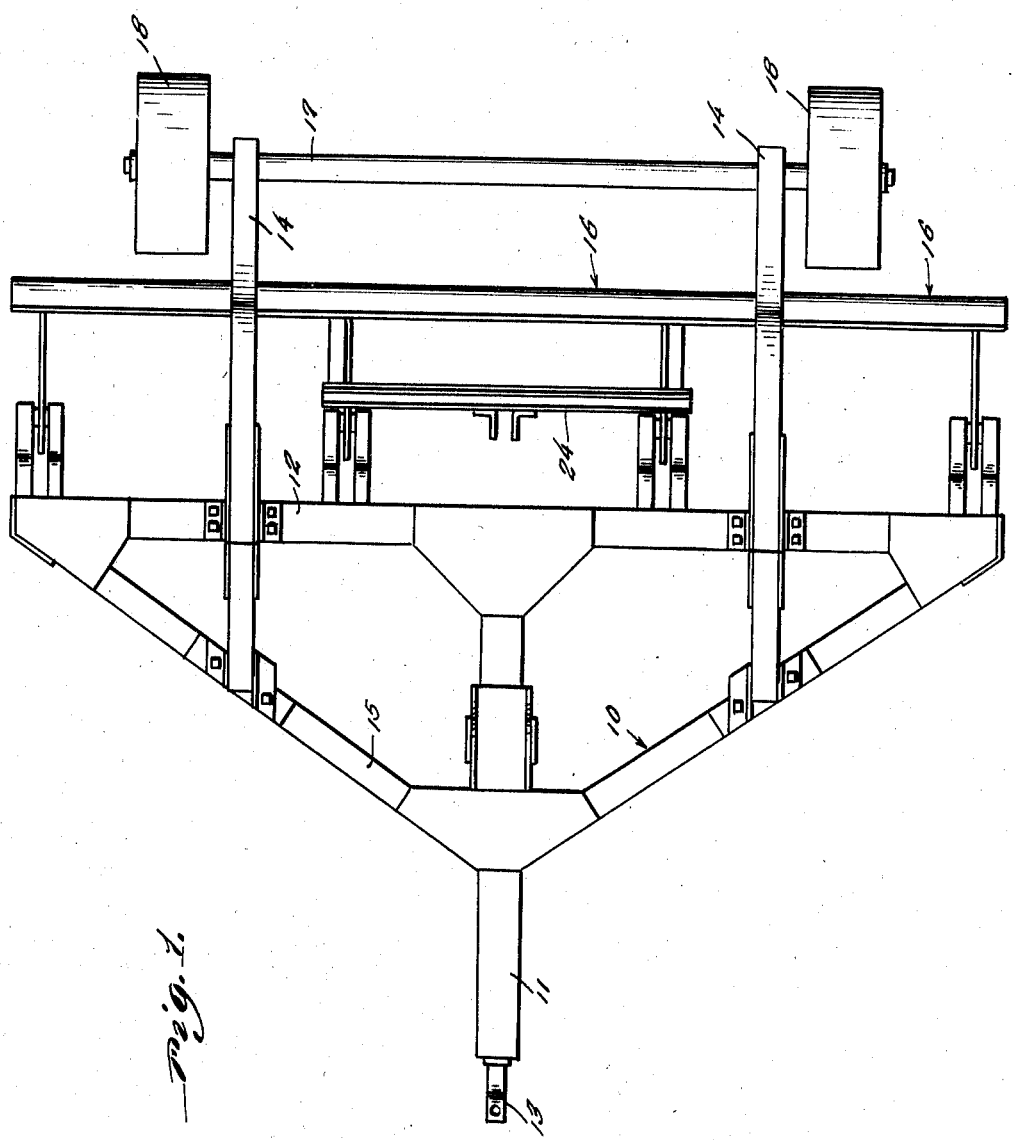
Inventor
J. L. Thomas

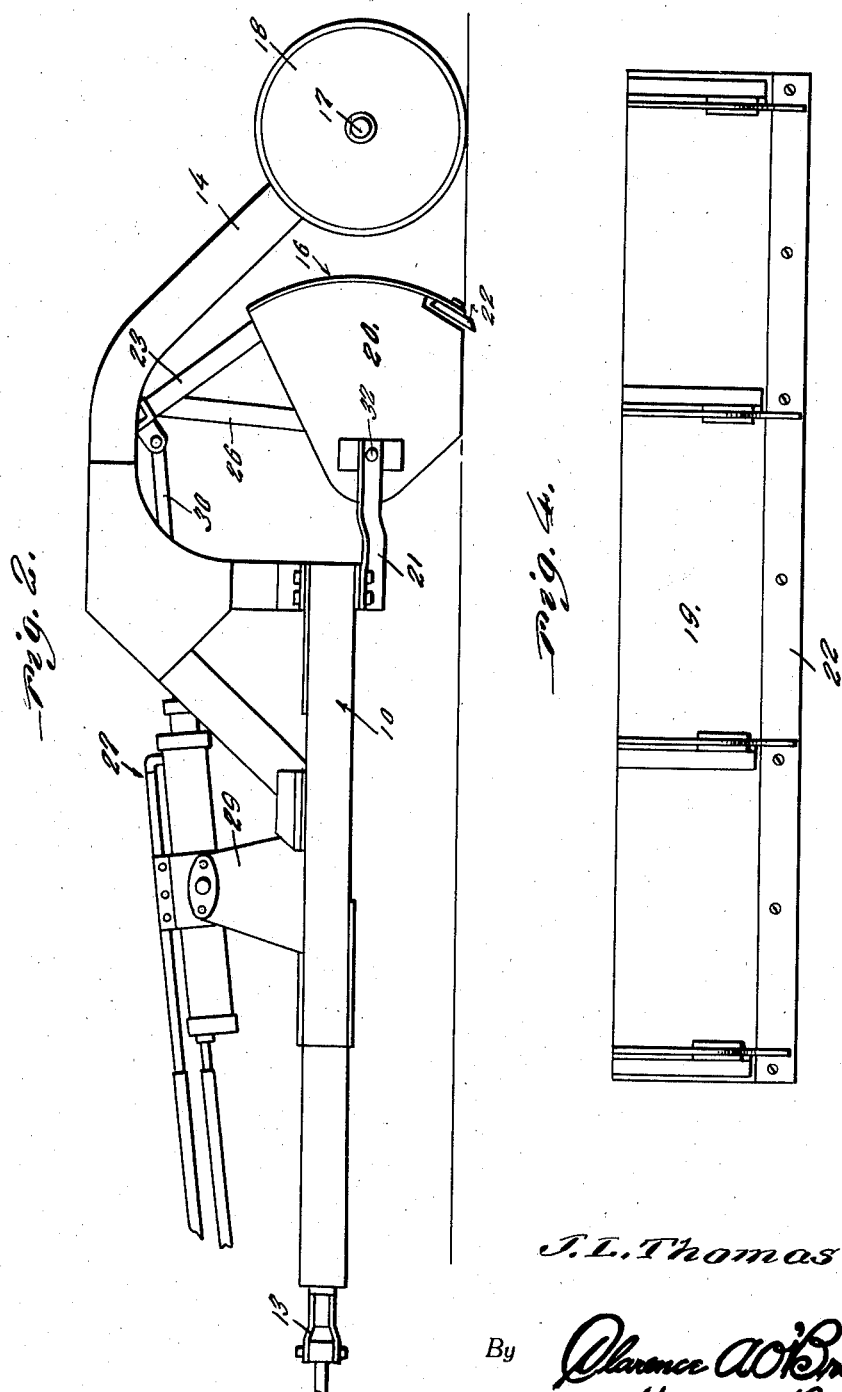

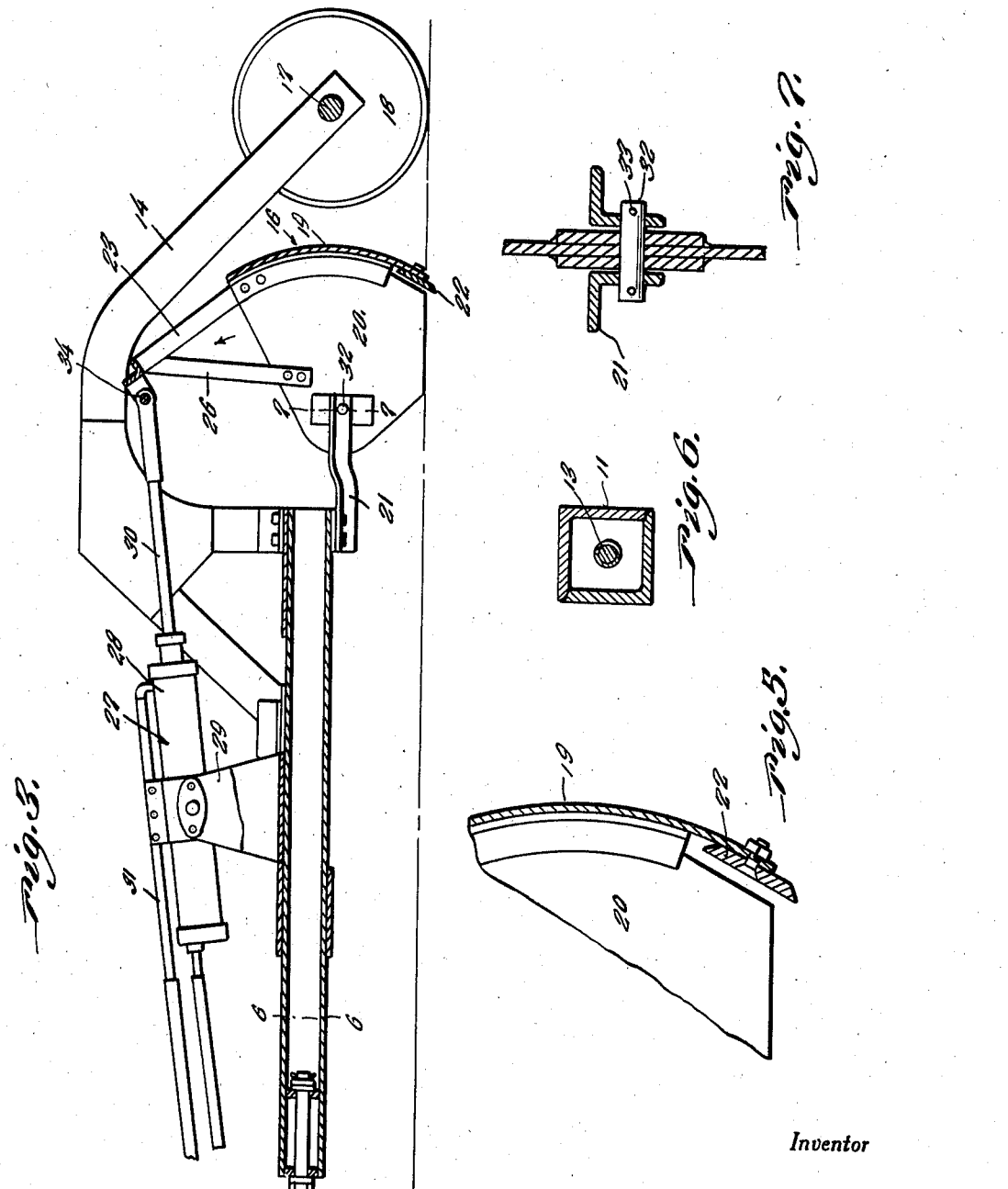

Patented Oct. 22, 1940

2,218,564

UNITED STATES PATENT OFFICE 2,218,564

DRAG TYPE SCRAPER

John L. Thomas, Somerton, Ariz.

Application July 26, 1938, Serial No. 221,416

1 Claim. (Cl. 37—169)

This invention relates to ground leveling devices and more particularly to a drag type scraper and has for the primary object the provision of a device of this character which will efficiently level the ground by removing the earth from high places and depositing the collected earth in low places as the device is drawn forwardly, the construction of the device being such that the leveling member which collects and deposits the earth may be readily varied with respect to the surface of the ground by hydraulic means so that the scraping action of the member on the ground may be varied to meet with different conditions.

Another object of this invention is the provision of a drag type scraper of the above stated character which will be durable, efficient and easily manipulated and may be manufactured and sold at a low cost.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a drag type scraper constructed in accordance with my invention.

Figure 2 is a side elevation illustrating the same.

Figure 3 is a vertical sectional view showing the scraper member and its mounting upon the frame and the means of adjusting said scraper member.

Figure 4 is a front elevation illustrating the scraper member.

Figure 5 is a fragmentary vertical sectional view showing a portion of the scraper member and the cutting blade carried thereby.

Figure 6 is a sectional view taken on line 6—6 of Figure 3.

Figure 7 is a detail sectional view taken on line 7—7 of Figure 3.

Referring in detail to the drawings, the numeral 10 indicates a main frame of substantially triangular shape having its apex disposed forwardly. The apex of the frame is secured on a draft tongue 11 which extends forwardly and rearwardly of said apex and has its rear end fastened on the rear transverse bar 12 of the frame. A suitable clevis 13 is secured to the forward end of the draft tongue whereby the latter may be conveniently coupled to a tractor or some other similar draft means.

Arched axle supporting members 14 have their forward ends secured on the converging members 15 of the frame and also on the transverse member 12 of the frame. The axle supporting members being arched permit free upward and downward movement of a ground leveling member 16 and have secured to their rear ends an axle 17 on which are journaled ground wheels 18 having comparatively broad tread surfaces.

The ground leveling member 16 consists of a rear wall 19 arcuately curved and of a length substantially equal to the width of the frame 10. The wall 19 of the leveling member 16 being arcuately curved provides a concaved face disposed next to the frame or presented in a forward direction of the device in entirety. Substantially triangular shaped plates 20 are secured to the concaved face of the plate or member 16 and are arranged right angularly thereto and extend forwardly thereof. The plates 20 are spaced and are so arranged to form substantially independent dirt receiving pockets in the leveling member 16. The plates 20 have certain edges thereof disposed substantially straight to contact the ground, as shown in Figure 3. The plates 20 are pivotally mounted on arms 21 secured to the transverse member 12 of the frame 10 and extending rearwardly thereof. The lower edge of the member or plate 19 has mounted thereon a removable scraper blade 22. The opposite edges of the scraper blade are sharpened so that it may readily be reversed on the leveling device whenever one edge becomes dull.

Upwardly and forwardly extending members 23 are secured on the leveling device or on the plate or member 19 thereof and are connected by a transverse bar 24, also are strengthened by braces 26, the lower ends of which are secured on certain of the plates 20.

A hydraulically operated means 27 is mounted on the frame 10 and is pivotally connected to the member 24. The hydraulic means is for the purpose of regulating the cutting action of the blade in the ground and also to provide means whereby the leveling device may be raised and lowered with respect to the ground for the purpose of dumping the leveling device or rendering it inoperative and to bring said leveling device as close to the ground as desired. The hydraulic means 27 consists of a cylinder 28 pivotally mounted on a bracket 29 carried by the frame 10 and operable in said cylinder (and not shown) is a piston, the stem thereof being indicated by the character 30 and is pivotally connected to the member 24. Fluid pipes 31 connect with opposite ends of the cylinder and to a source (not shown), also a control means (not shown), whereby fluid may be introduced into either end of the cylinder for the purpose of moving the piston therein in opposite directions to bring about raising and lowering of the leveling member. The fluid source may be carried by the tractor or other power means used for drawing the device over the ground.

The device as shown in the drawings and described in detail in the foregoing specification is compact, durable and efficient and may be pulled or drawn over the ground while operating on the latter with a minimum amount of horse power.

The arms 21 are arranged in pairs so that each pair receives therebetween a plate 20, the latter being connected to said arms by a pivot pin 32 carrying cotter keys or the like 33 in the ends thereof. The pins 32 can be easily removed when desiring to detach the leveling member from the frame, also the leveling member may be conveniently detached from the hydraulic operating means through the removal of a pivot pin, as indicated at 34.

It is believed that the foregoing description, when taken in connection with the accompanying drawings will fully set forth the construction and advantages of this invention to those skilled in the art to which such a device relates, so that further detailed description will not be required.

Having described the invention, what I claim is:

A drag type scraper comprising a triangular shaped frame, a draft tongue connected to the apex of said frame, pairs of rigid rearwardly extending horizontally arranged arms on said frame, arched members having their forward ends fixed to said frame to form therewith a rigid structure, an axle carried by the rear ends of said arched members and spaced from the frame, ground wheels journaled on said axle, relatively spaced substantially triangular-shaped plates pivotally mounted between said pairs of arms, an arcuately curved plate secured to said substantially triangular shaped plates and co-operating therewith in forming a plurality of dirt collecting pockets and located between the axle and the frame and below said arched members, a scraper blade removably mounted on the lower edge of said arcuately curved plate, upwardly and forwardly extending arms having curved portions secured on certain of said substantially triangular shaped plates adjacent the arcuately curved plate, a member connecting said arms above said plates, braces connecting said arms and certain of said triangular shaped plates, and an operating means mounted on the frame and connected with the last-named member.

JOHN L. THOMAS.